United States Patent [19]
Thomas

[11] 3,980,270
[45] Sept. 14, 1976

[54] VALVE FOR CONTROLLING THE FLOW OF GASES UNDER HIGH PRESSURE FROM STORAGE VESSELS

[76] Inventor: Morgan Carlos Thomas, Estrada Froes 503, Sao Francisco, Niteroi, Estado do Rio de Janeiro, Brazil

[22] Filed: May 5, 1975

[21] Appl. No.: 574,509

[30] Foreign Application Priority Data
May 30, 1974  Brazil.................................. 4.428/74

[52] U.S. Cl.................................... 251/30; 251/89; 251/63.4; 251/14
[51] Int. Cl.²........................................ F16K 31/06
[58] Field of Search................. 251/30, 89, 14, 63.4

[56] References Cited
UNITED STATES PATENTS

| | | | |
|---|---|---|---|
| 2,129,938 | 9/1938 | Johnson | 251/30 |
| 2,378,404 | 6/1945 | Grant, Jr. | 251/30 X |
| 2,398,775 | 4/1946 | Beekley et al. | 251/30 X |
| 2,733,041 | 1/1956 | Crookston | 251/14 |
| 2,819,865 | 1/1958 | Olson | 251/63.4 X |
| 2,830,784 | 4/1958 | Placette | 251/14 |
| 3,865,132 | 2/1975 | Wiegand | 251/63.4 X |

*Primary Examiner*—Arnold Rosenthal

[57] ABSTRACT

Valve for controlling the flow of gases under high pressure from storage vessels such as cylinders comprising a solenoid operated pilot valve built into the valve body and operable to cause a floating piston to actuate a main valve stem by moving against a shoulder on said stem, there being a clearance between a seat for said piston and said shoulder to permit the introduction of a safety pin or fork to lift and immobilize the piston to avoid its acting under pressure and causing accidental discharge.

2 Claims, 2 Drawing Figures

VALVE FOR CONTROLLING THE FLOW OF GASES UNDER HIGH PRESSURE FROM STORAGE VESSELS

This invention refers to a valve assembly for controlling the flow of gases under high pressure from storage vessels such as cylinders, for use principally in fixed $CO_2$ fire extinguishing systems.

In similar valves presently in use, operation of the pilot valve is obtained through the action of an external device attached to a main valve (or cylinder valve) and which works through a system of solenoid, levers and springs to open the pilot valve and permit operational discharge of the cylinders.

This external device, known as a Control Head, is more expensive and complex than the main valve itself and therefore calls for a more efficient and simplified way of controlling the flow of gas than that provided by the expensive and complex Control Head.

This invention consequently aims at developing a new valve assembly in which the action of a solenoid or mechanical means is applied directly to the pilot orifice inside the valve body itself also accommodating a main valve, eliminating the necessity of an external device.

This results in a more compact assembly which in turn permits inclusion of the discharge and operating mechanism in the valve body through the use of the conventional piston operated by the pilot valve. To prevent accidental discharge of the main valve, the piston is made to "float" on the valve stem which permits the use of a safety fork which lifts the piston off its seat on the valve stem and prevents its being moved by pressure from the pilot valve if the latter is accidentally actuated prior to installation in the system. On removing this safety fork after installation, the main valve is put in operating condition and will discharge the gas if the pilot valve is actuated by the solenoid or manually.

The operation and advantages of this invention can best be explained by reference to the drawings illustrating the subject valve assembly for application on high pressure cylinders.

Figure 1:
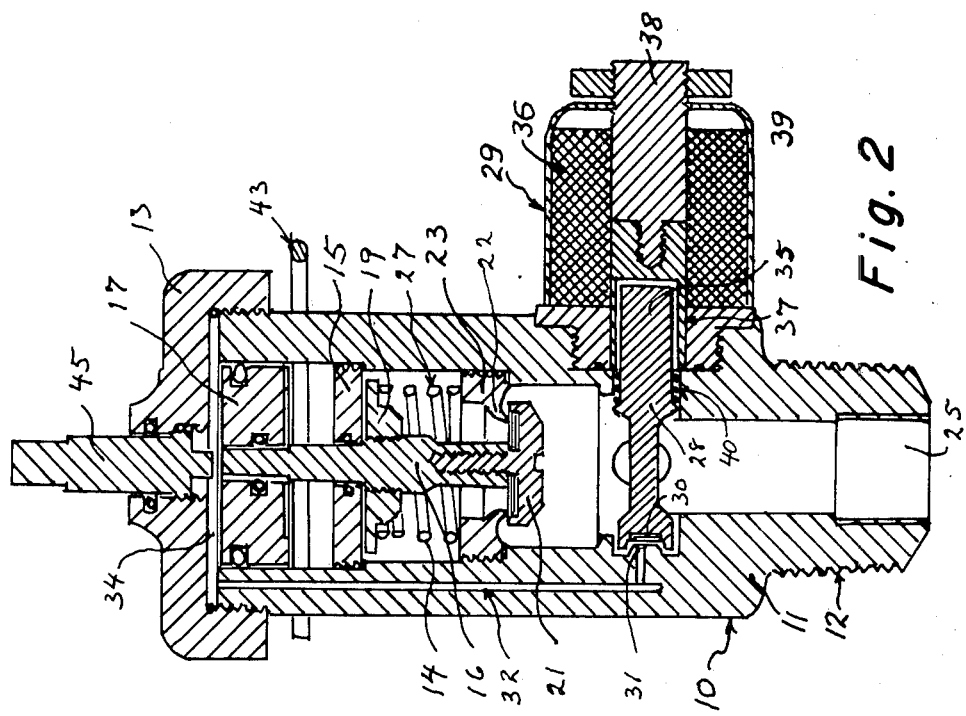
FIG. 1 shows a longitudinal cross section of the subject valve assembly.
Figure 2:
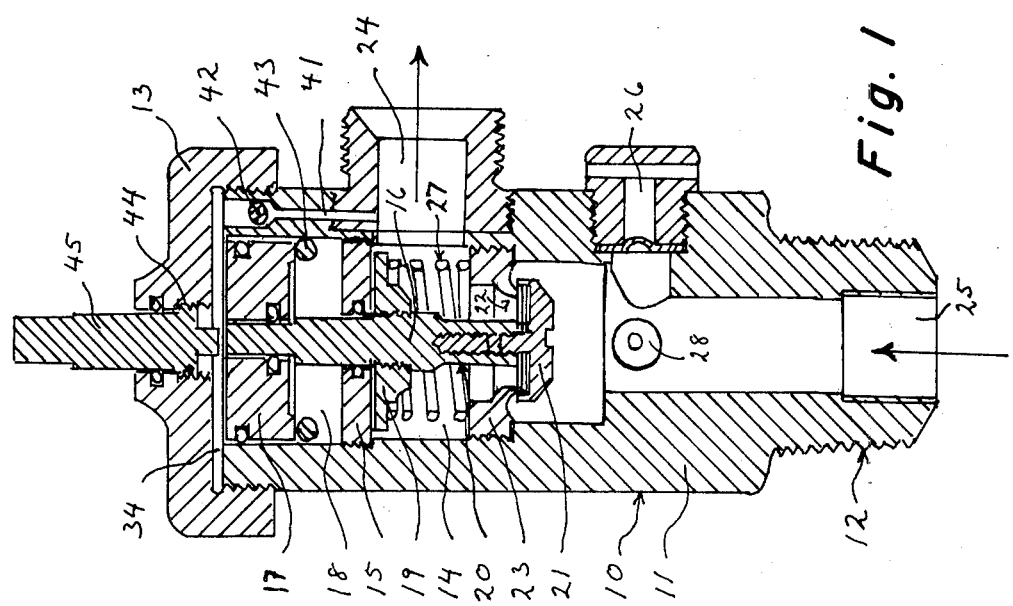
FIG. 2 shows a longitudinal cross section at 90° to that shown in FIG. 1.

Referring to these drawings, and particularly to FIG. 1 and FIG. 2 showing a valve assembly 10 for controlling the flow of gases under high pressure from a cylinder as specified by this invention, 11 indicates the valve body for attachment to the cylinder (not shown) containing the gas under high pressure by means of the threads 12 at the lower extremity. The valve body 11 is bored axially forming a chamber 14 into which is screwed a main valve seat ring 23 and a valve stem guide plate 15. This guide plate supports the valve stem 16 onto which is attached a flange 19 and at the tapered lower end 20 the valve poppet 21 which is held firmly against the main valve seat 22 by action of the spring 27.

The valve poppet 21 and the main valve seat 22 constitute a main valve which is closed when the valve poppet 21 seats on the valve seat 22 and open when the valve poppet is unseated from the valve seat 22.

Between the guide plate 15 and main valve seat ring 23 is a lateral discharge opening 24 formed by an adaptor screwed into the valve body 11.

Below the main valve seat 22 is another lateral opening into which is screwed a safety plug 26 which seats against a disc designed to burst under excessive pressure and release the gas through the balanced orifices provided.

The pilot valve plunger 28 is placed across the lower, or pressure side of the valve. The pilot valve plunger 28 is acted upon by a valve spring 40 and the pressure of gas in the cylinder. One end 30 of the pilot valve plunger 28 normally presses against the pilot valve seat 31 acted. The opposite end of the plunger 35 is inside the hermetically sealed solenoid casing 37 and when acted upon by an electric current in the coil 36 which creates a magnetic field through the casing 37 and the cover 29, is attracted away from the valve seat 31. This allows passage of gas under pressure through the valve seat 31 and along the channel 32 until it reaches the upper chamber 34.

The pilot valve plunger 28 and the pilot valve seat 31 constitute a pilot valve which is closed when the plunger 28 seats on the seat 31 and open when the plunger 28 is unseated from the seat 31.

At the upper end of the valve stem 16 is a piston 17 which is depressed when the gas under pressure from the pilot valve seat 31 and channel 32 reaches and fills the chamber 34. The Piston 17 normally "floats" on the upper end of the valve stem 16 but when depressed by pressure in the chamber 34 it bears on a shoulder on the valve stem and forces it downwards, thereby unseating the valve poppet 21 from the main valve seat 22 thus allowing discharge of the gas through the discharge opening 24.

On the upper side of the discharge opening 24 there is another channel 41 leading to the upper chamber 34 having a ball check 42 at its upper extremity. The ball check prevents escape of pressure from the chamber 34 when the plunger 28 is unseated from the valve seat 31 but allows entry of gas from the outer system incorporating other cylinders when said other cylinders are discharged, thus depressing the piston 17 and adding the discharge of the cylinder to which the valve assembly 10 is attached to the system.

To avoid accidental operation of the valve 10 while in storage, in transit or being installed, there is a safety fork 43 which is inserted through appropriate holes in the valve body 11 between the guide plate 15 and the lower surface of the piston 17. This lifts the piston 17 off the shoulder on the valve stem 16 and immobilizes the piston 17 so that it cannot descend and unseat the valve seat ring 23 even if pressure is applied inadvertently to the chamber 34. When installation of the valve assembly 10 is complete this safety fork 43 is removed leaving the valve in operative condition.

Normally, this valve assembly 10 is operated by means of the electric solenoid and or pneumatically through pressure applied to the discharge opening 24 as described above. However, a manual means of operation is provided by means of a screw down plunger 45 engaged in the valve cover 13 by means of the threads 44. When the plunger 45 is screwed down it depresses the valve stem 16 and consequently the valve poppet 21 is unseated from the main valve seat 22 allowing the gas to escape through the discharge port 24. When pressure builds up in the system, the gas reaches the upper chamber 34 through the channel 41 and around the ball check 42 and depresses the piston 17 fully unseating the valve poppet 21 from the main valve, seat 22 and keeping the valve poppet 21 unseated until discharge is complete. With the safety fork 43 inserted the piston 17 cannot be depressed but the valve stem 16 will move downwards independently of the piston 17 thereby unseating the valve poppet 21 from the main valve seat 22 and allowing the gas to flow in a controlled manner according to the distance the plunger 45 is screwed down on the valve stem 26. This is a desirable feature when testing a system or for other purposes when a small controlled amount of gas is required.

By omitting the channel 41 and ball check 42 and allowing an appropriate leakage from the chamber 34 in constructing the valve assembly, it can be adapted to other purposes than fire extinguishing systems where an interruptable flow of gas may be desired as by interrupting the current through the solenoid coil the valve pilot valve, and the main will close.

I claim:

1. In a valve assembly for controlling the flow of a fluid or gas such as $CO_2$ under high pressure from storage vessels such as cylinders, incorporating in a single unit; a valve body defining a pressure chamber; a main valve in said pressure chamber having a valve stem movable to cause said main valve to open; a shoulder on said valve stem, a piston which normally floats freely on the valve stem but movable to bear against said shoulder on the valve stem to cause the valve stem to move to open the main valve; a pilot valve accommodated in said valve body and controlling flow of fluid under pressure to said piston; an electrically operated solenoid plunger operatively associated with said pilot valve for actuating same to open and permit said fluid under pressure to flow to said piston and move it against said shoulder on the valve stem; there being a space adjacent said piston when the main valve is closed for receiving a safety fork member to hold said piston off said shoulder on the valve stem to immobilize said piston and prevent it from moving the valve stem to open the main valve, and a manual means of operation comprising a manually rotatable plunger movable to contact said valve stem independently of said piston to open said main valve.

2. A valve assembly as claimed in claim 1, in which the entire asssembly is arranged so as to permit the fitting thereof inside a standard protective cover normally screwed on to high pressure gas cylinders.

* * * * *